United States Patent [19]
Goldberg

[11] 4,258,936
[45] Mar. 31, 1981

[54] COUPLING

[75] Inventor: Harold D. Goldberg, Hazelcrest, Ill.

[73] Assignee: Allied Tube & Conduit Corporation, Harvey, Ill.

[21] Appl. No.: 110,221

[22] Filed: Jan. 7, 1980

[51] Int. Cl.³ .............................................. F16L 19/00
[52] U.S. Cl. ...................................... 285/31; 285/90; 285/388
[58] Field of Search ................... 285/31, 32, 387, 388, 285/90, 12

[56] References Cited

U.S. PATENT DOCUMENTS

| | | |
|---|---|---|
| 187,343 | 2/1877 | Bailey . |
| 658,692 | 9/1900 | Williams ............................ 285/12 |
| 1,119,752 | 12/1914 | Goethner et al. . |
| 1,301,244 | 4/1919 | Ford ................................... 285/32 |
| 1,570,155 | 1/1926 | Karbowski .................... 285/90 X |
| 2,391,632 | 12/1945 | Knight et al. . |
| 2,563,366 | 8/1951 | Raymond ........................ 285/387 |
| 2,926,027 | 2/1960 | Marquis, Jr. ..................... 285/32 |
| 3,984,130 | 10/1976 | Berger et al. . |
| 4,082,319 | 4/1978 | Berger et al. . |

FOREIGN PATENT DOCUMENTS 10085 of 1896 United Kingdom .

*Primary Examiner*—Thomas F. Callaghan
*Attorney, Agent, or Firm*—Fitch, Even, Tabin, Flannery & Welsh

[57] ABSTRACT

A coupling for connecting tubular conduits and the like in end-to-end relation, the connected ends of the conduits having identical external threads formed thereon. The coupling includes inner and outer coupling elements, the inner of which is longitudinally moveable within an internal bore in the outer and both of which have threaded internal bores which enable both elements to be threaded onto either of the conduit ends to a position enabling alignment of the conduits by relative lateral movement therebetween after which the outer coupling element may be threaded onto the other of the conduits so as to draw the adjacent ends of the conduits into aligned abutting relation. In an alternative embodiment, the inner coupling element may be moved longitudinally onto the threaded end of the conduit without requiring threading thereon, after which the inner coupling element may be removed by unthreading. In both embodiments, the coupling may be removed from the coupled conduits without damaging the coupling or conduits, thereby enabling salvaging and reuse.

10 Claims, 7 Drawing Figures

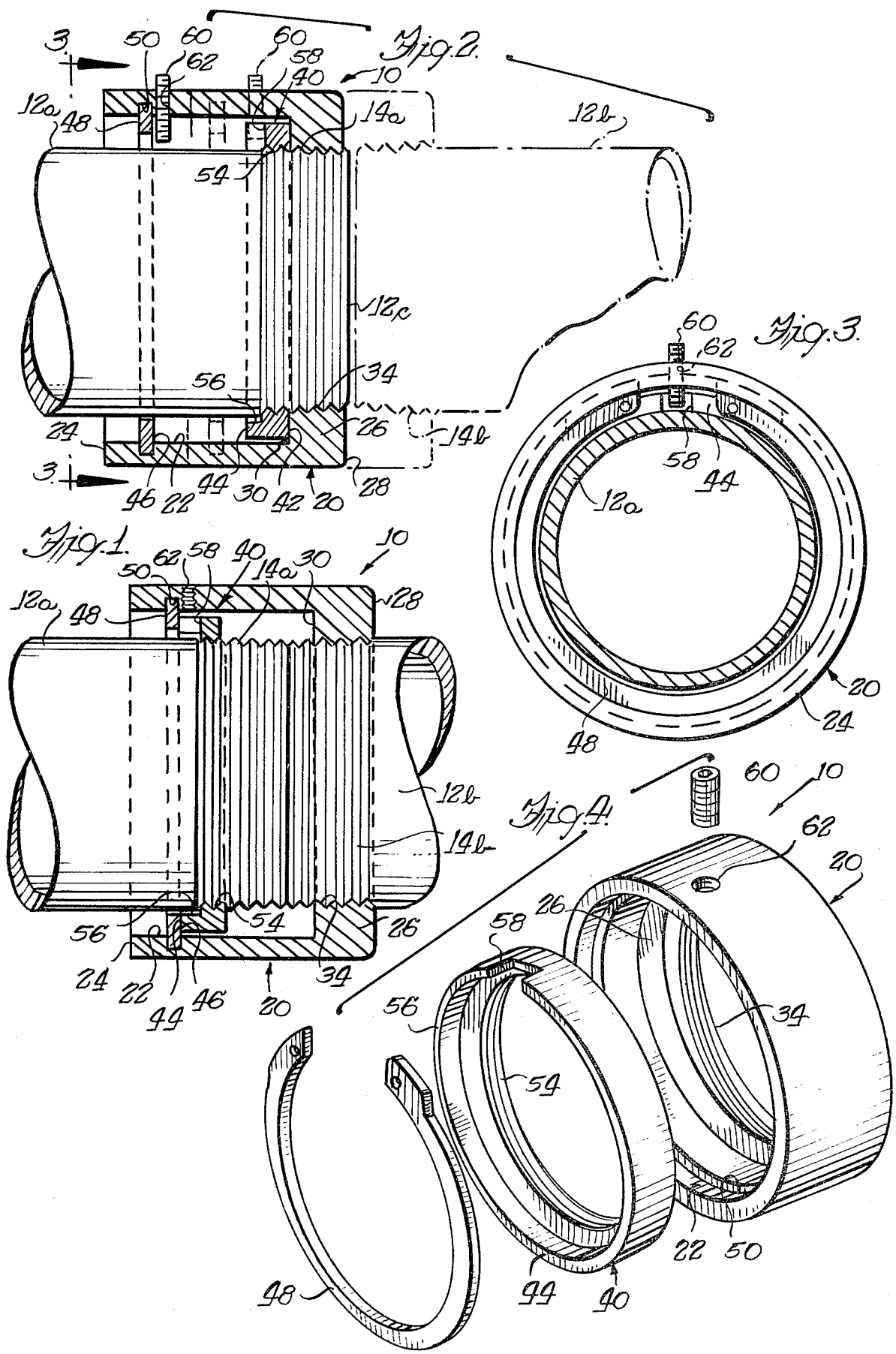

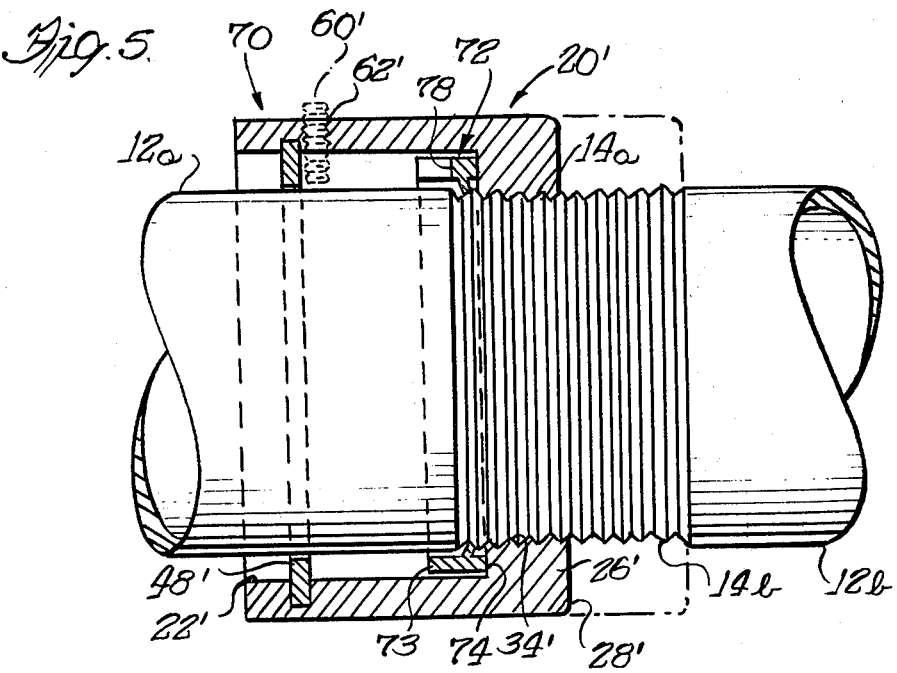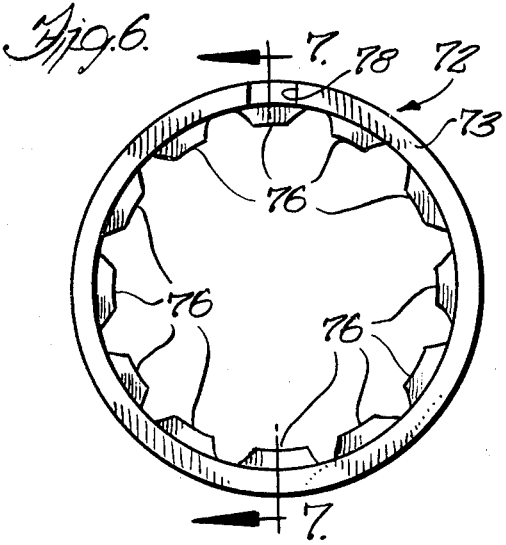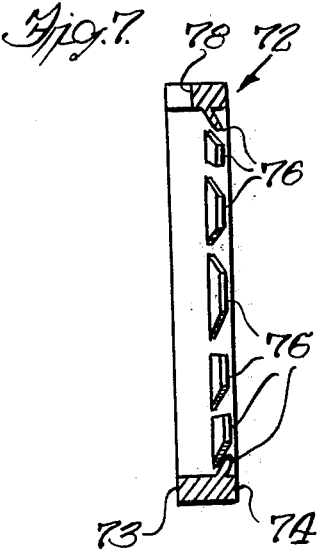

COUPLING

The present invention relates generally to couplings for connecting tubular conduits or pipe and the like, and more particularly to a novel coupling enabling connection of identically threaded adjacent ends of conduit or pipe in axial aligned relation while facilitating axial positioning of the conduits through relative lateral movement therebetween.

It is a conventional practice in many types of pipe or conduit systems, and particularly in electrical systems employing tubular conduits, to connect a number of lengths of conduit in end-to-end relation through means of couplings so as to form a continuous conduit system as necessary for a particular application. In the case of thin wall conduit, which is primarily employed for encasing electrical cable or conductor wires in applications where the conduit will not be subjected to large stresses, compression fittings or couplings may be employed which are swaged or otherwise affixed to adjacent ends of conduit lengths. The conduit is generally available in different lengths, commonly 10 and 20 foot lengths, and may be quite readily formed to various bend contours and coupled end-to-end through the compression couplings.

Another type of conduit which is particularly useful in commercial and industrial applications is generally termed rigid pipe or conduit. Such conduit may, for example, range up to 2½ inches or greater in outer diameter and may have a wall thickness of 0.100 inch or greater which facilitates forming of external threads on the opposite ends of each length of conduit to enable their connection in end-to-end relation. As with thin wall conduits, the rigid pipe or conduit is also conventionally made in lengths of up to 10 to 20 feet long. Due to their relative weight, the rigid pipe lengths are not as readily manipulated during installation and are frequently installed where access is relatively limited so that rotation of the individual lengths of conduit during initial installation, and more particularly during replacement of an intermediate length, may be quite difficult, if not impossible.

One known technique for connecting lengths of rigid pipe or conduit in end-to-end relation is to provide generally V-shaped external pipe threads of standard size on the opposite ends of each length or section of conduit and then connect the desired number of conduit lengths in end-to-end relation through couplings having internal pipe threads therein which enable threaded connection with adjacent ends of conduit to form a structurally sound connection or coupling. A major drawback in this technique is that the coupling must be threaded onto one conduit section or length followed by relative movement between this conduit section and the conduit section to which it is to be coupled so that the conduit sections are in axial alignment. This generally requires relative longitudinal movement between adjacent conduit sections with simultaneous relative rotation therebetween to effect threaded engagement between the second conduit section and the coupling. Should the need subsequently arise to replace an intermediate section or length of conduit, either a length of the conduit or one or more couplings, or both the conduit and the couplings, must be destroyed in order to effect disassembly.

In order to eliminate the aforementioned drawback in prior coupling techniques, attempts have been made to provide couplings for joining lengths of rigid conduit which do not require rotation of the conduit but facilitate coupling through rotation of one portion of the coupling while the conduits remain relatively stationary. See, for example, U.S. Pat. No. 1,119,752 dated Dec. 1, 1914. A significant drawback in this coupling, however, is that with the coupling installed on the threaded end of a first length of conduuit, a second length of conduit must be moved longitudinally into axial alignment with the first conduit in order to receive the connecting portion of the coupling in threaded connection thereon so as to draw the second length of conduit into the coupling. In many installations, such relative longitudinal movement between lengths or segments of conduit may not be possible due to space limitations, this being particularly so when replacing intermediate lengths of conduit where the conduit lengths often cannot be moved longitudinally and require substantially lateral movement to remove the replace them.

More recent developments in couplings for rigid wall conduits, and particularly conduits defined in "medium" or "intermediate" wall conduit, permits the removal of individual intermediate lengths of conduit without axialy displacing adjacent conduits sections or disassembling the conduit system from one end to the point where replacement of a section or fitting is required. See, for example, U.S. Pat. Nos. 3,984,130, dated Oct. 5, 1976, and No. 4,082,319, dated Apr. 4, 1978. While the couplings disclosed in these two patents enable axial alignment of adjacent ends of conduit sections through lateral movement of one of the conduit sections relate to the other, the couplings require the forming of a reduced diameter annular recess on one end of each conduit to permit a sleeve portion of the coupling to be retracted axially along the lenght of the corresponding conduit far enough for the end face of the coupling sleeve to lie flush with the end face of the corresponding conduit. This entails substantially increased manufacturing costs and also requires selective assembly inasmuch as the conduit sections must be assembled with an externally threaded end of one conduit section adjacent a recessed end of the next conduit. Additionally, the coupling must first be assembled onto the recessed end of a conduit section along with a locking ring, thus requiring further selective assembly.

A general object of the present invention is to provide a novel coupling for connecting adjacent ends of descrete lengths or sections of conduit or pipe in end-to-end relation, and which facilitates axial alignment of the conduit sections by relative lateral movement therebetween.

A more particular object of the present invention is to provide a novel coupling for connecting descrete lengths or sections of pipe or conduit in end-to-end relation which requires only that the conduit sections have identical external threads formed on their opposite ends, the coupling being adapted for assembly onto either one of a pair of adjacent ends of conduit sections to be connected and enabling lateral movement therebetween to axially aligned positions whereafter the coupling may be manipulated to connect the aligned conduit sections through rotation of a portion of the coupling while the conduit sections remain in relatively fixed relation.

A still further object of the present invention is to provide a novel coupling for connecting descrete lengths or sections of pipe or conduit in axially aligned relation and wherein the adjacent ends of the conduit sections to be connected have identical external threads formed thereon, the coupling including an outer coupling element having an internal cavity in which an internal coupling element is axially movable, the outer and inner coupling elements having internally formed means which enable assembly of both of the coupling elements onto the threaded end of either one of the conduit sections to be connected so as to facilitate relative lateral movement between the conduit sections to axially aligned positions whereafter the outer coupling element may be threaded onto the other conduit section to bring the conduit sections into fixed abutting relation. The coupling may be disassembled in a manner to enable salvaging of the coupling end conduits.

A feature of one embodiment of the coupling in accordance with the present invention lies in the provision of identical threads formed internally of the inner and outer coupling elements, and stop means releasably cooperable with the outer and inner coupling elements to prevent relative rotation therebetween and enable threading of the inner coupling element onto the threaded end of one conduit whereafter the stop may be released from the inner coupling element to enable threaded mounting of the outer conduit onto the same conduit without rotation of the inner coupling element.

Further objects and advantages of the present invention, together with the organization and manner of operation thereof, will become apparent from the following detailed description of the invention when taken in conjunction with the accompanying drawings wherein like reference numerals designate like elements throughout the several views, and wherein:

FIG. 1 is a longitudinal sectional view of one embodiment of a coupling constructed in accordance with the present invention shown in assembled relation with adjacent ends of aligned lengths of conduit or pipe;

FIG. 2 is a longitudinal sectional view of the coupling of FIG. 1 showing the manner of mounting the coupling onto the threaded end of a first length of conduit preparatory to coupling the first conduit to a second axially aligned length of conduit as shown in phantom;

FIG. 3 is a transverse sectional view taken substantially along line 3—3 of FIG. 2, looking in the direction of the arrows;

FIG. 4 is an exploded perspective view of the coupling of FIG. 1;

FIG. 5 is a longitudinal sectional view similar to FIG. 2 but illustrating an alternative embodiment of a coupling in accordance with the present invention;

FIG. 6 is a detail end view of the inner coupling element employed in the coupling of FIG. 5; and FIG. 7 is a transverse sectional view taken substantially along line 7—7 of FIG. 6, looking in the direction of the arrows.

Referring now to the drawings, and in particular to FIGS. 1-4, one embodiment of a coupling for connecting or coupling together two lengths or sections of tubular pipe or conduit in accordance with the present invention is indicated generally at 10. The coupling 10 finds particular application in connecting together two descrete lengths or sections of tubular pipe or conduit, such as indicated at 12a and 12b in FIG. 2, which are generally defined as medium or heavy wall conduit and on which are formed identical right-hand external standard tapered pipe threads at each end, as indicated at 14a and 14b. The standard external tapered pipe threads formed on opposite ends of each length or section of conduit enable threaded connection of the conduit sections to standard fittings or in axially aligned relation by means of one or more couplings 10 to establish a desired conduit system. Other than forming standard identical external pipe threads on the opposite ends of the conduit sections, the coupling 10 does not require any special preparation of the conduit sections, thus reducing initial manufacturing costs and eliminating the need for any special preparation of the conduit at the work site.

As will become more apparent hereinbelow, the coupling 10 may be mounted on one conduit section, such as 12a, in a manner to enable connection with another conduit section, such as 12b, after positioning the conduit sections in axial aligned relation by moving the conduit sections laterally relative to each other without the necessity for substantially longitudinal movement of either conduit sections relative to the other. This feature is particularly desirable in applications where access is relatively limited and relative longitudinal movement between adjacent sections of conduit is difficult, if not impossible. By use of the couplings 10 in a conduit system, an intermediate length or section of conduit may be removed or replaced without having to disturb other conduit sections.

The coupling 10 may be employed with metallic and non-metallic pipes or conduits of sufficient wall thickness to enable forming of external pipe threads on their opposite ends. A particularly desirable feature of the coupling 10 is that it facilitates disconnection of coupled conduit sections without damaging the coupling or associated conduit sections, thus providing a coupling which is salvageable and reuseable.

The coupling 10 includes a first or outer annular coupling element, indicated generally at 20, which is preferably made of a suitable metallic material and has an internal cylindrical axial bore or chamber opening outwardly of an end 24 and of a diameter greater than the external diameter of the conduit sections with which the coupling will be employed. The coupling element 20 is formed with a radially inwardly directed annular flange 26 which defines an end 28 of the coupling opposite the end 24 and also defines a stop surface 30 establishing the axial inward limit of the bore 22. A straight pipe thread 34 is formed internally of the radial flange 26 of a size to enable threaded engagement of the coupling element 20 with either of the external tapered pipe threads 14a or 14b formed on opposite ends of the conduits 12a,b.

The coupling 10 includes a second or inner annular coupling element 40 which is received within the bore 22 of the outer coupling element 20 and is axially movable therein. To this end, the coupling element 40 preferably has a cylindrical outer peripheral surface of a diameter enabling free axial movement within the bore 22, and has a predetermined longitudinal width as defined between planar parallel stop surfaces 42 and 44 formed on the inner coupling element. The coupling element 40 is generally coaxial with the outer coupling element 20 and is axially movable within the bore 22 between the stop surface 30 and a stop surface 46 defined by a snap ring member 48 removeably mounted within an annular groove 50 formed within the outer coupling element so that the stop surface 46 is spaced a predetermined distance from the stop surface 30.

The inner coupling element 40 has an internal straight pipe thread 54 formed axially therethrough which is identical to the internal straight pipe threaded 34 formed within the coupling element 20 and thus is also adapted for threaded engagement with either of the external tapered pipe threads 14a,b formed on conduit sections 12a and 12b. The coupling element 40 preferably is formed with a cylindrical recess 56 intersecting the end 44 thereof, the recess 56 having a diameter slightly greater than the outer diameter of the conduits 12a,12b with which the coupling 10 is to be employed. A radial slot 58 is formed in coupling element 40 so as to intersect end surface 44, and has a lateral width of sufficient size to receive a radial stop member 60 when the coupling element 40 is in a predetermined position within the bore 22. The stop member 60 may comprise a conventional externally threaded set screw which is releasably threaded within a radial threaded bore 62 formed in outer coupling element 20 in relatively close proximity to the snap ring 48, as best seen in FIGS. 1 and 2, and is adapted for selective cooperation with inner coupling element 40 so as to prevent rotation of the inner coupling element relative to the outer coupling element.

In operation, the set screw 60 is adjusted within the bore 62 of the outer coupling element 20 so as to extend radially into the bore 22 and the inner coupling element 40 is positioned so that the set screw is received within the radial slot 58 to prevent relative rotation between the inner and outer coupling elements. The coupling 10 is then positioned in axial alignment with the threaded end of a conduit or pipe section, such as 12a, enabling the inner coupling element 40 to be threaded onto the threaded end 14a by rotating the outer coupling element 20 in a right-hand or clockwise direction relative to the external thread 14a. With stop member 60 disposed within radial slot 58, the inner coupling element 40 is threaded onto the threaded end 14a until it is firm thereon, as shown by the solid line position of the inner coupling element and the phantom position of the outer coupling element in FIG. 2. The outer coupling element 20 may thereafter be moved longitudinally to free the stop member 60 from the radial slot 58, thus enabling threaded engagement and assembly of the outer coupling element 20 onto the same threaded end 14a of conduit 12a.

The longitudinal lengths of the threaded ends 14a and 14b longitudinal widths of the inner coupling element 40 and the radial flange 26 of the outer coupling element 20 are of predetermined size so that when the inner and outer coupling elements are thus threaded onto the same threaded end 14a of conduit 12a, the outer end 28 of the outer coupling element is substantially flush with the end surface 12c of conduit section 12a. Such positioning of coupling 10 on conduit section 12a enables a second conduit section, such as 12b, to be brought into axial alignment with the conduit 12a through relative lateral movement between conduit sections 12a and 12b.

Either prior to or after axially aligning the conduit sections 12a and 12b, the stop member 60 is removed from or adjusted outwardly relative to the outer coupling element 20 a sufficient distance to free it from the inner coupling element 40. In this manner, the outer coupling element 20 may be rotated to effect threaded engagement of internal thread 34 with the adjacent external threaded end 14b of conduit 12b. The distance between stop surface 30 on the outer coupling element and stop surface 46 on the stop ring 48 is such that when the internal thread 34 is fully engaged with external thread 14b, the stop surface 46 on snap ring 48 engages the stop surface 44 on the inner coupling element 40. In this manner, continued rotation of the outer coupling element 20 onto the threaded end 14b of conduit section 12b effects axial drawing together of the conduit sections 12a,b into abutting relation and establishes a relatively fixed coupled relation between the pipe or conduit sections.

When it is desired or necessary to disassemble one of the coupled conduit sections 12a,b from the other, the aforenoted procedure is merely reversed. Specifically, the outer coupling element 20 is rotated in a direction to effect disengagement from conduit section 12b and threaded engagement onto the threaded end 14a of conduit section 12a a distance sufficient to enable relative lateral movement between the aligned conduit sections, it being understood that the opposite end of any conduit to be so removed must also be disconnected from its next adjacent length of conduit in the system. After removing the outer coupling element from the connected conduit section and removing the disconnected conduit section, the coupling 10 may be disassembled from the conduit 12a for salvage and reuse.

FIGS. 5-7 illustrate an alternative embodiment of a coupling, indicated generally at 70, constructed in accordance with the present invention. In the embodiment of FIGS. 5-7, elements of the coupling 70 which are identical to the aforedescribed coupling 10 are indicated by corresponding primed reference numerals. In general, the coupling 70 is substantially the same as the aforedescribed coupling 10 except that it employs a second or inner annular coupling element, indicated generally at 72, which enables assembly onto the threaded end, such as 14a, of conduit section by forcing the inner coupling element axially over the external threads without requiring rotation of the inner coupling element.

Referring particularly to FIGS. 6 and 7, the inner coupling element 72 has a longitudinal or axial width as defined between parallel planar end surfaces 73 and 74, which is equal to the longitudinal width of the aforedescribed inner coupling element 40. The inner coupling element 72 has a plurality of generally radially inwardly directed teeth 76 formed thereon in circumferentially spaced relation about the annular coupling body, the teeth 76 being formed so as to establish an inner generally circular periphery of a diameter substantially equal to the median minor or root diameter of the tapered pipe threads 14a and 14b formed on the conduit sections 12a,b. The radial teeth 76 are formed so as to be slightly angled or inclined from their base connections to the annular coupling body toward the end surface 74, as illustrated in FIG. 7, and have sufficient flexibility to enable the inner coupling element 72 to be forced longitudinally over an external thread such as 14a without rotating the inner coupling element. In this manner, coupling 70 may be assembled onto the threaded end 14a of conduit section 12a by axially aligning the coupling with the conduit section and initially forcing the inner coupling element longitudinally onto the threads 14a followed by threaded engagement of the outer coupling element 20 with the threaded end 14a so as to force the inner coupling element further onto the threaded end and establish a flush relation of the end surface 28' of the outer coupling element with the end of conduits 12a.

It will be appreciated that with the teeth 76 slightly inclined from true radial positions, such as being inclined toward end surface 74, the teeth 76 will flex as the inner coupling element 70 is forced longitudinally over the external threaded 14a and will reseat within the base of a thread convolution when the coupling element is in a desired assembled position. It will also be appreciated that the external threaded ends 14a,b on the conduit sections and the longitudinal widths of the flange 26' and inner coupling element 72 are of predetermined dimensions so that both the inner and outer coupling elements may be assembled onto either one of the threaded conduit ends.

Following assembly of the coupling 70 onto the conduit section 12a as aforedescribed, a second conduit section such as 12b may be moved into axial alignment with the conduit section 12a through relative lateral movement therebetween. The outer coupling element 20' may then be unthreaded from the threaded end 14a and threaded onto the threaded end 14b of the adjacent aligned conduit section 12b. The outer coupling element 20' has a stop ring 48' mounted within its bore 22' so as to effect engagement of the stop ring with the end surface 76 on the inner coupling element 72 when the outer coupling element reaches a fully threaded engagement with the thread end 14b of conduit 12b. Further tightening of the outer coupling element 20' onto the threaded end 14b establishes a coupled abutting relation of the adjacent end surfaces of the conduit sections 12a and 12b in similar fashion to the coupling 10. Similarly, when it is desired or necessary to disassamble the coupled conduit sections 12a,b, the coupling element 20' is unthreaded from the threaded end 14b of conduit 12b and threaded onto the end 14a of conduit 12a to enable relative lateral movement between the conduits 12a and b.

After removing the conduit section 12b, the coupling element 20' may be unthreaded from the threaded end 14a of conduit section 12a. To prepare for removal of the inner coupling element 70 from the conduit 12a, a stop member 60' in the form of a set screw is threaded into a threaded radial bore 62' in the outer coupling element 20' so as to extend radially into the chamber 22'. The outer coupling element 20' is then moved longitudinally outwardly from the conduit 12a and rotated as necessary to position the stop member 60' within a radial slot 78 formed in the coupling element 72. Thereafter, rotation of the outer coupling element 20' in counter-clockwise or left-hand direction, assuming a right-hand thread 14a, is operative to unthread the coupling element 72 from the threaded end 14a for removal and salvaging of the coupling 70.

Thus, in accordance with the present invention, various embodiments of a coupling are provided which are relatively economical to manufacture and which enable coupling or connection of similar size pipe or conduit sections having external pipe threads formed on their opposite ends. The couplings in accordance with the invention enable connection of descrete lengths or sections of similar size conduit after positioning the conduit sections in axial alignment through relative lateral movement therebetween without requiring substantial relative longitudinal movement between the conduit sections or requiring special forming of annular grooves or recesses circumferentially of the ends of the conduit sections.

While preferred embodiments of the present invention have been illustrated and described, it will be understood that changes and modifications may be made therein without departing from the invention in its broader aspects. Various features of the invention are defined in the following claims.

What is claimed is:

1. A coupling for connecting two conduit sections or the like in axially aligned end-to-end relation, said conduit sections having identical external threads formed on at least one end of each of said conduit sections, said coupling comprising:

a first coupling element having an internal chamber opening outwardly of one end and being of sufficient size to receive the threaded end of either of said conduit sections therein, said first coupling element having an internal thread adapted for threaded engagement with the threaded end of either of said conduit sections when inserted within said chamber, a second coupling element disposed within said chamber and axially movable therein, said second coupling element having an opening therethrough the circumference of which is defined by means adapted for releasable connection to the threaded end of either of said conduit sections when received within said chamber, means supported by said first coupling element within said chamber and cooperative with said first coupling element to limit axial movement of said second coupling element within said chamber, and stop means cooperable with said first and second coupling elements to enable selective interconnection thereof, said first and second coupling elements and said threaded ends of said conduit sections being adapted for interconnection of said second coupling element with the threaded end of a selected one of either of said conduit sections when said coupling is disposed in adjacent substantially axial alignment with said selected conduit section followed by threaded engagement of said first coupling element with said threaded end to effect a substantially flush relation of said coupling with the end of said selected conduit section so as to enable relative lateral movement between said two conduit sections to establish close axial alignment of said conduit sections, said first coupling element being releasable from said selected conduit section and adapted for threaded engagement with the other conduit section in a manner to maintain said conduit sections in substantially fixed coupled relation.

2. The coupling as defined in claim 1 wherein said first coupling element comprises an annular coupling element, said chamber being substantially cylindrical and of sufficient size to receive said threaded conduit end therein.

3. The coupling as defined in claim 1 wherein said first coupling element has a radially inwardly extending annular flange formed thereon contiguous to said chamber, said internal thread being formed on and internally of said annular flange.

4. The couplings as defined in claim 2 wherein said second coupling element comprises an annular coupling element having an outer cylindrical peripheral surface of a diameter less than the diameter of said internal chamber.

5. The coupling as defined in claim 1 wherein said means defining the circumference of said opening through said second coupling element comprises an internal thread adapted for threaded engagement with the threaded end of either of said conduit sections when received within said chamber.

6. The coupling as defined in claim 1 wherein said means defining the circumference of said opening through said second coupling element comprises a plurality of generally radially inwardly directed teeth formed circumferentially of said opening, said teeth enabling longitudinal movement of said second coupling element over the threaded end of said selected conduit section but requiring rotation of said second coupling element to remove it from the threaded end of said selected conduit section.

7. The coupling as defined in claim 6 wherein said teeth are inclined relative to a plane transverse to the longitudinal axis of said second coupling element, said teeth defining an internal opening of a diameter approximately equal to the median base diameter of the external conduit threads over which said second coupling element is moved during connection thereto and being of sufficient flexibility to enable longitudinal movement of said second coupling element along said external threads without rotating said second coupling element.

8. The coupling as defined in claim 3 wherein said first coupling element has an annular groove formed within said internal chamber spaced axially from said annular flange, said means supported by said first coupling element to limit axial movement of said second coupling element including a retaining ring mounted within said annular groove.

9. The coupling as defined in claim 1 wherein said second coupling element has a radial slot formed therein, said stop means comprising a stop pin mounted on said first coupling element for selective cooperation with said radial slot so as to prevent relative rotation between said first and second coupling elements.

10. A coupling as defined in claim 9 wherein said stop means comprises a setscrew adjustably mounted within a threaded radial bore in said outer coupling element.

* * * * *